United States Patent
Wolf et al.

(10) Patent No.: US 12,469,098 B2
(45) Date of Patent: Nov. 11, 2025

(54) VALIDATING AN EVENT RESPONSE IN AN EVENT SYSTEM

(71) Applicant: Honeywell International Inc., Charlotte, NC (US)

(72) Inventors: Benjamin H. Wolf, Leicester (GB); Matthieu Dubocquet, Sérézin-du-Rhône (FR); Michael Barson, Nuneaton (GB); Christopher Dearden, Melton Mowbray (GB)

(73) Assignee: Honeywell International Inc., Charlotte, NC (US)

( * ) Notice: Subject to any disclaimer, the term of this patent is extended or adjusted under 35 U.S.C. 154(b) by 264 days.

(21) Appl. No.: 18/108,776

(22) Filed: Feb. 13, 2023

(65) Prior Publication Data
US 2024/0273662 A1  Aug. 15, 2024

(51) Int. Cl.
| G06Q 10/10 | (2023.01) |
| G06Q 10/0639 | (2023.01) |
| G06Q 40/08 | (2012.01) |
| G06Q 50/26 | (2024.01) |
| H04W 76/10 | (2018.01) |

(52) U.S. Cl.
CPC ..... *G06Q 50/265* (2013.01); *G06Q 10/06398* (2013.01); *H04W 76/10* (2018.02)

(58) Field of Classification Search
CPC .......... G06Q 50/265; G06Q 10/06398; H04W 76/10; G08B 25/001; G08B 17/00; G08B 19/00; H04L 67/12; H04L 67/306
USPC .................................................. 705/1.1–912
See application file for complete search history.

(56) References Cited

U.S. PATENT DOCUMENTS

| 7,019,646 B1 * | 3/2006 | Woodard ............... | G08B 17/10 |
| | | | 340/815.4 |
| 9,824,574 B2 * | 11/2017 | Piccolo, III .......... | G08B 29/188 |
| 10,249,177 B2 | 4/2019 | Powers, III et al. | |
| 11,132,891 B2 | 9/2021 | Dearden et al. | |
| 11,616,837 B2 * | 3/2023 | Kane ....................... | H04L 67/10 |
| | | | 709/203 |
| 11,990,230 B2 * | 5/2024 | Pierson ................ | G08B 25/016 |
| 2012/0064855 A1 | 3/2012 | Mendelson | |
| 2012/0218102 A1 * | 8/2012 | Bivens ................. | G08B 25/003 |
| | | | 340/539.11 |
| 2014/0365390 A1 * | 12/2014 | Braun ................... | H04W 4/023 |
| | | | 705/325 |

(Continued)

OTHER PUBLICATIONS

Mpeis, et al., "A Geolocation and Smart Alert System for Nearby First Responders on Roll-on/Roll-off Vessels"; ERCIM News, vol. 123 (Oct. 2020) (2 pgs).

*Primary Examiner* — Jonathan P Ouellette
(74) *Attorney, Agent, or Firm* — Brooks, Cameron & Huebsch, PLLC

(57) ABSTRACT

Devices, systems, and methods for validating an event response in an event system are described herein. In some examples, one or more embodiments include a mobile device comprising a memory and a processor to execute instructions stored in the memory to connect to an event device in response to an event occurring associated with the event device, determine an amount of time taken between when the event was initiated and when the mobile device connected to the event device, and transmit, to a remote computing device, a user profile associated with the mobile device and the amount of time.

17 Claims, 4 Drawing Sheets

(56) References Cited

U.S. PATENT DOCUMENTS

2016/0300465 A1* 10/2016 Britton ............. G08B 13/19697
2017/0263111 A1   9/2017 Deluliis et al.
2019/0392700 A1* 12/2019 Darling ............ G08B 13/19684
2020/0045528 A1*  2/2020 Yanamandra ........... H04M 1/00
2021/0082263 A1   3/2021 Dwight et al.
2022/0108622 A1   4/2022 Derickson et al.

* cited by examiner

VALIDATING AN EVENT RESPONSE IN AN EVENT SYSTEM

TECHNICAL FIELD

The present disclosure relates to devices, systems, and methods for validating an event response in an event system.

BACKGROUND

Facilities, such as commercial facilities, office buildings, hospitals, campuses (e.g., including buildings and outdoor spaces), and the like, may have an alarm system that can be triggered during an event, such as an emergency situation (e.g., a fire, a security event, etc.). Such an alarm system may include an event system having a control panel (e.g., a fire control panel, an alarm system control panel, etc.) and a number of system devices (e.g., sensors, sounders, pull stations, etc.) located throughout the facility (e.g., on different floors and/or in different rooms of the facility) that can perform an action when a hazard event is occurring in the facility and provide a notification of the hazard event to the occupants of the facility via alarms or other mechanisms.

DETAILED DESCRIPTION

Figure 1:
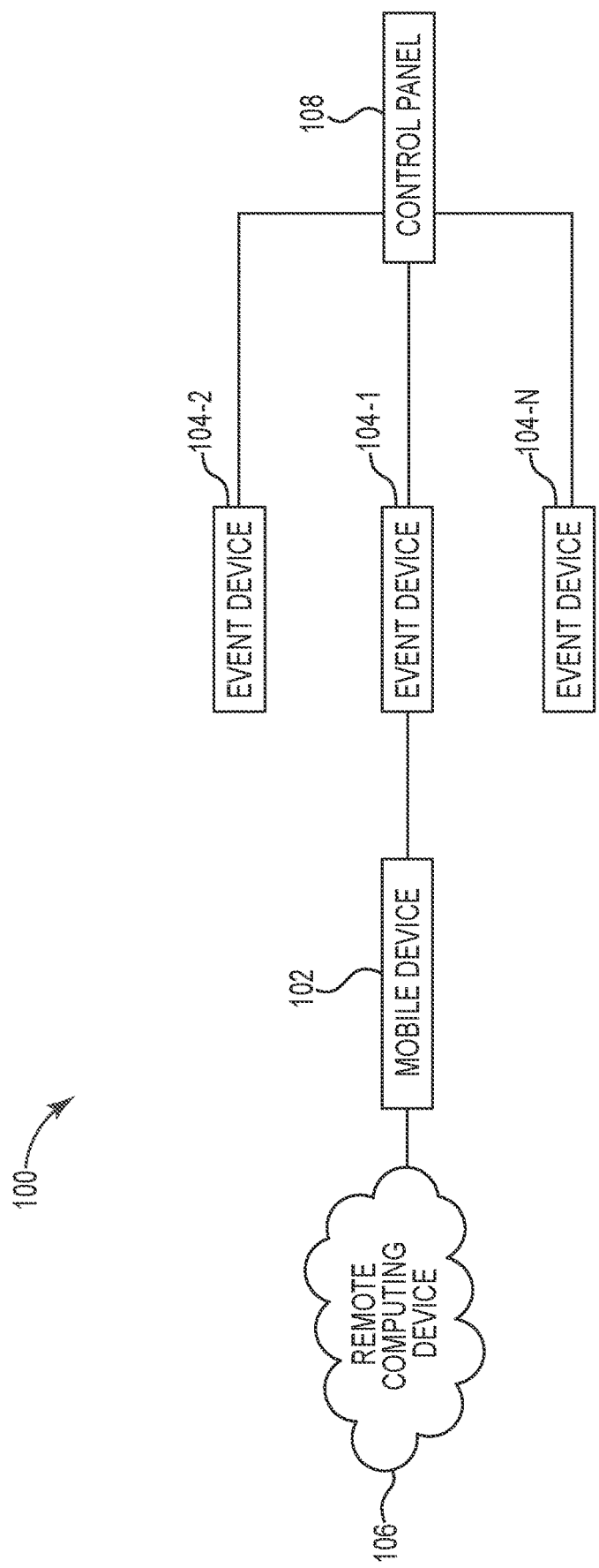
FIG. 1 is an example of a system for validating an event response in an event system, in accordance with one or more embodiments of the present disclosure.

Devices, systems, and methods for validating an event response in an event system are described herein. In some examples, one or more embodiments include a mobile device comprising a memory and a processor to execute instructions stored in the memory to connect to an event device in response to an event occurring associated with the event device, determine an amount of time taken between when the event was initiated and when the mobile device connected to the event device, and transmit, to a remote computing device, a user profile associated with the mobile device and the amount of time.

A facility can utilize an event system in order to warn occupants of the facility of an emergency event, such as a fire, security event, etc. As used herein, the term "event system" refers to a system of devices to provide an audible and/or visible warning in an emergency event. For example, the event system can utilize event devices to warn occupants of the emergency event occurring in the space, such as a fire, security event, etc. As used herein, the term "event device" refers to a device that can receive an input relating to an event and/or generate an output relating to an event. Such event devices can be a part of the event system of a space in a facility/in the facility at large and can include devices such as fire sensors, smoke detectors, heat detectors, carbon monoxide (CO) detectors, or combinations of these; motion detectors; entry sensors (e.g., door sensors, window sensors, glass break sensors, shock/vibration sensors, etc.); interfaces; manual call points (MCPs); pull stations; input/output modules; aspirating units; and/or audio/visual devices (e.g., speakers, sounders, flashers, buzzers, microphones, cameras, video displays, video screens, etc.), and/or relay output modules, among other types of event devices.

In some cases, members of staff of such a facility may be tasked with managing and supporting an event system in the facility. For example, a building manager may utilize support staff, such as security personnel, reception staff, etc., for tasks like managing and supporting the event system. Such tasks may include responding to an event detected by the event system.

Such support staff roles can be filled by transient workers. For example, persons in such support staff roles may change jobs frequently, which can result in difficulty in training and managing competence of persons in these support staff roles since they stay at the role for a short amount of time. Accordingly, frequent site visits to the facility and review of staff responses to events (e.g., actual emergency events and/or a training events) may be needed to train and/or manage persons in such support roles. However, such site visits can be time and cost prohibitive.

In addition, certain facilities may have poorly labeled event devices (e.g., inaccurate/vague labeling, poor re-labeling of devices if a space in the facility changes usage type, etc.). In such an instance, it may be difficult for a member of the staff to locate an event device (e.g., whether during an actual emergency event and/or in a training event) and to verify a detected event by the event device. Such a scenario risks the member of the staff locating the wrong event device (e.g., by visiting an incorrect area of the facility), or not locating any event devices at all. If an actual emergency event is occurring, such a member of the staff may report that the event is a false alarm when the event is in fact a real emergency event, which may be catastrophic for the facility and/or the occupants therein.

Validating an event response in an event system, according to the present disclosure, can allow for a user of a mobile device to easily locate an event device in a facility. The mobile device can allow the user of the mobile device to be certain they have located the correct event device during an emergency event and/or during a training event. For example, upon location of the event device, the mobile device can validate that the user has located the correct event device. Accordingly, such an approach can allow for more efficient and less costly training, management, and guidance of support staff in managing an event system in a facility, as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for validating an event response in an event system, in accordance with one or more embodiments of the present disclosure. The system 100 can include a mobile device 102, event devices 104-1, 104-2, 104-N, remote computing device 106, and a control panel 108.

As mentioned above, the system 100 can be included in a facility, a space in a facility, etc. The system 100 can include an event system. The event system can include a device/series of devices in order to detect events and/or process and/or analyze the detected events to determine whether to generate an alarm for occupants of the facility.

Such devices to detect events can include event devices 104-1, 104-2, 104-N. For example, the event devices 104-1, 104-2, 104-N can be devices to detect events and/or process and/or analyze the detected events. As mentioned above, the event devices 104-1, 104-2, 104-N can include, for example, fire sensors, smoke detectors, heat detectors, carbon monoxide (CO) detectors, or combinations of these; motion detectors; entry sensors (e.g., door sensors, window sensors, glass break sensors, shock/vibration sensors, etc.); interfaces; manual call points (MCPs); pull stations; input/output modules; aspirating units; and/or audio/visual devices (e.g., speakers, sounders, flashers, buzzers, microphones, cameras, video displays, video screens, etc.), and/or relay output modules, among other types of event devices.

The system 100 can include a control panel 108. The control panel 108 can be utilized to control the various event devices 104 included in the system 100.

The system 100 can further include a mobile device 102. As used herein, a mobile device can include devices that are (or can be) carried and/or worn by the user. The mobile device 102 can be a phone (e.g., a smart phone), a tablet, a personal digital assistant (PDA), a laptop, smart glasses, and/or a wrist-worn device (e.g., a smart watch), among other types of mobile devices. Although not illustrated in FIG. 1 for clarity and so as not to obscure embodiments of the present disclosure, the mobile device 102 can include a user interface.

As illustrated in FIG. 1, the mobile device 102 can be connected to the remote computing device 106. The mobile device 102 can be connected to the remote computing device 106 via a wired and/or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

In some examples, a user of the mobile device 102 may be sent to locate one of the event devices 104-1, 104-2, 104-N in the facility. Such a user may be sent to locate one of the event devices 104-1, 104-2, 104-N in order to verify whether an event detected by one of the event devices 104-1, 104-2, 104-N is a real event and/or may be sent to locate one of the event devices 104-1, 104-2, 104-N for training purposes, among other examples. The user may utilize the mobile device 102 for more efficient location of the correct event device 104-1, 104-2, 104-N for validating an event response as compared with previous approaches, as is further described herein.

As mentioned above, a user may utilize the mobile device 102 to locate an event device 104-1, 104-2, 104-N in various scenarios, such as in a training event or in an emergency event. An event can be initiated in different ways depending on the type of event, as is further described herein.

For instance, in some examples, the event may be a training event to help a user practice locating an event device 104-1, 104-2, 104-N. Such training may help a user navigate the facility to locate an event device 104-1, 104-2, 104-N quickly in the event of a real emergency event. In order to begin the training event, the control panel 108 can initiate an event. Such a training event may be initiated by the control panel 108 in response to a user input to the control panel 108, in response to an input to the control panel 108 from another device (e.g., the mobile device 102, the remote computing device 106, or any other device not illustrated in FIG. 1), may be initiated by the control panel 108 according to a timed delay (e.g., control panel 108 receives input, then waits a predetermined amount of time (e.g., two minutes) before initiating the training event), may be initiated by the control panel 108 according to a predetermined schedule (e.g., once a month, etc.) and/or according to a predetermined frequency, may be initiated in response to a direct input from the remote control panel 106, and/or may be initiated by a direct input from other system control equipment located on site at the facility, etc. In such an instance, initiation of the event can cause an event device of the event devices 104-1, 104-2, 104-N to be activated. For example, event device 104-1 may be activated in response to the control panel 108 initiating the training event. Activation of the event device 104-1 may include the event device 104-1 exiting a sleep mode, emitting a visual indicator, emitting an audible indicator, combinations thereof, and/or any other activation mechanism. Accordingly, a user of the mobile device 102 may utilize the mobile device 102 to efficiently locate the activated event device of the event devices 104-1, 104-2, 104-N, as is further described herein.

However, in some examples, the event may be an emergency event. For example, an event device 104-1, 104-2, 104-N may detect an emergency event occurring. For instance, event device 104-1 may detect an event via an input (e.g., heat, smoke, breaking glass, etc.) that exceeds a threshold amount (e.g., a threshold heat, a threshold smoke amount, noise and/or vibrations that exceed a threshold amount, respectively, etc.) and the event device 104-1 can initiate the event in response to detecting the event. Additionally, initiation of the event can cause the event device 104-1 to be activated. For example, event device 104-1 may be activated in response to event device 104-1 detecting the event by exiting a sleep mode, emitting a visual indicator, emitting an audible indicator, combinations thereof, and/or any other activation mechanism. Accordingly, a user of the mobile device 102 may utilize the mobile device 102 to efficiently locate the activated event device of the event device 104-1 to verify whether the detected event is a real emergency event or a non-emergency event (e.g., a false alarm), as is further described herein.

When the mobile device 102 is proximate to the event device 104-1, the mobile device 102 can connect to the event device 104-1 (e.g., in response to an event occurring associated with the event device 104-1). For example, if the event is a training event or if the event is an emergency event, the user can utilize the mobile device 102 to transit to a proximate location of the event device 104-1 (e.g., as is further described in connection with FIG. 2). Once the mobile device 102 is proximate to the event device 104-1, the mobile device 102 can connect to the event device 104-1 (e.g., as is further described in connection with FIG. 2).

The mobile device 102 can determine an amount of time taken between when the event was initiated and when the mobile device 102 connected to the event device 104-1. For example, the mobile device 102 can determine that four minutes elapsed between when the event was initiated and when the mobile device 102 connected with the event device 104-1.

A user of the mobile device 102 may have a user profile associated with the user stored on the mobile device 102. The user profile can include a collection of settings and other information associated with a user of a device. Such a user profile can be utilized to analyze actions taken by the particular user associated with the user profile, such as how long it took the user to locate the event device 104-1 and the mobile device 102 connecting with the event device 104-1, as mentioned above. In some instances, the mobile device 102 may be shared between multiple users, and such multiple users can have their own unique associated user profiles as well. Accordingly, individual users of the mobile device 102 can have their actions taken in connection with an event occurring (e.g., as described above) evaluated for training purposes, for review following an emergency event, etc., as is further described in connection with FIGS. 2 and 3. Additionally, such information can be included in a report, as is further described in connection with FIG. 3.

Accordingly, the mobile device 102 can transmit, to a remote computing device 106, the amount of time taken between when the event was initiated and when the mobile device 102 connected to the event device 104-1 and a user profile associated with the mobile device 102. The remote computing device 106 can utilize the amount of time taken and the user profile to evaluate the actions taken by the user of the mobile device 102, as is further described in connection with FIGS. 2 and 3.

As mentioned above, in some instances, an event device 104-1, 104-2, 104-N may detect an event and the user of the mobile device 102 can respond to determine whether the detected event is an emergency event or a non-emergency event (e.g., a false alarm). For example, the user of the mobile device 102 can respond to locate the event device 104-1 that detected a fire event (e.g., and has activated itself), and the mobile device 102 can connect to the event device 104-1 once the user locates the event device 104-1. The user may determine that there is no fire and that the fire event detected by the event device 104-1 is a non-emergency event. Accordingly, the control panel 108 can silence the event. For example, in response to the event being a non-emergency event, the mobile device 102 connecting to the event device 104-1, and the mobile device 102 receiving an input indicating the event is a non-emergency event, the control panel 108 can silence the event. The input to the mobile device 102 can be, for example, a user selecting a button on a user interface of the mobile device 102 (e.g., not illustrated in FIG. 1), as is further described in connection with FIG. 3. In response to the control panel 108 silencing the event, the event device 104-1 can deactivate (e.g., re-enter a sleep mode, cease emitting a visual indicator, cease emitting an audible indicator, etc.).

As mentioned above, the mobile device 102 can assist a user of the mobile device 102 in locating an event device 104-1, 104-2, 104-N. Additionally, the mobile device 102 can connect to an event device 104-1, 104-2, 104-N under certain conditions. Such an approach is further described in connection with FIG. 2.

Figure 2:
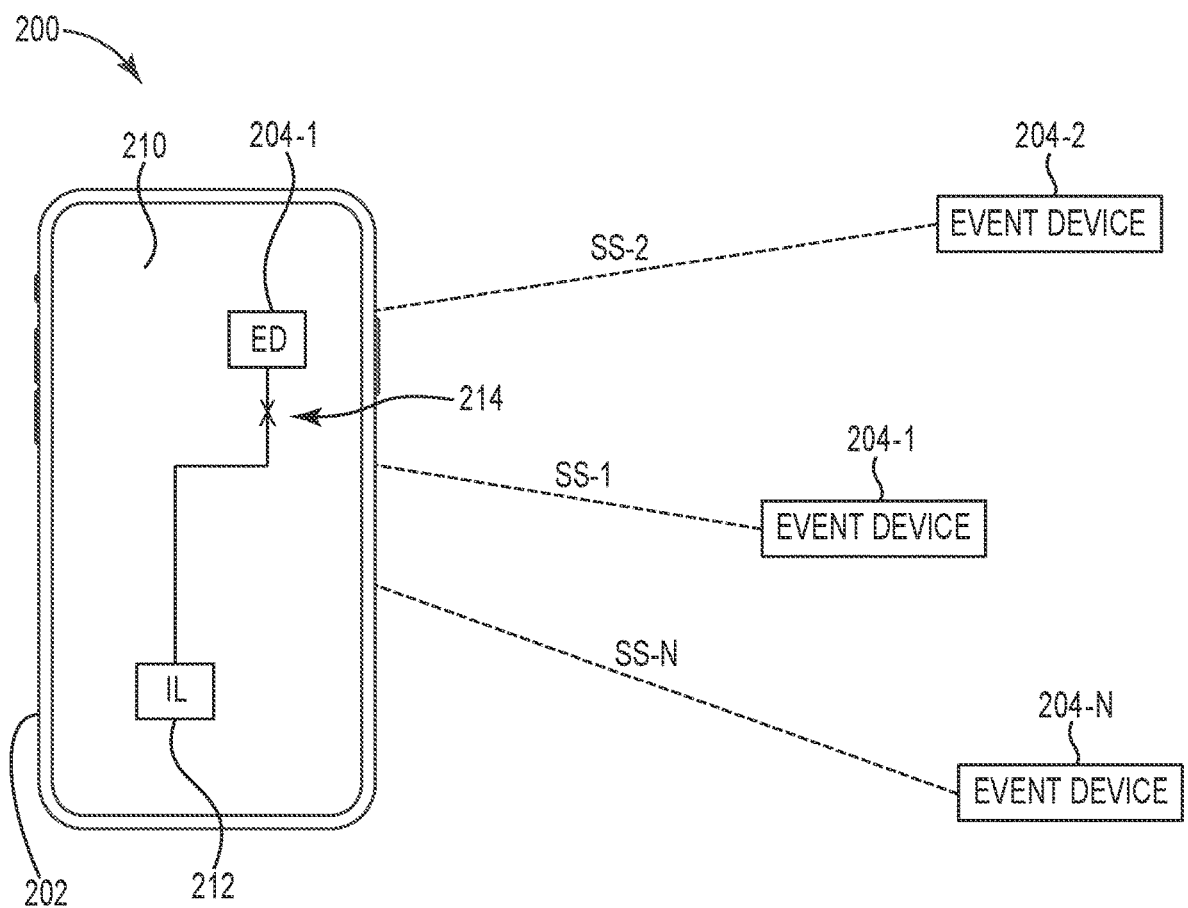
FIG. 2 is an example of a mobile device and event devices for validating an event response in an event system, in accordance with one or more embodiments of the present disclosure.

FIG. 2 is an example of a mobile device 202 and event devices 204-1, 204-2, 204-N for validating an event response in an event system, in accordance with one or more embodiments of the present disclosure. The system 200 illustrated in FIG. 2 can include the mobile device 202 and the event devices 204-1, 204-2, 204-N.

As previously described in connection with FIG. 1, an event can occur that is associated with an event device 204-1, 204-2, 204-N. For example, the event may be a training event associated with event device 204-1 initiated by a control panel, the event may be an emergency event detected by event device 204-1, etc.

In some examples, the mobile device 202 can display, via a user interface on a display 210 of the mobile device, directions to the event device 204-1. The directions can include a path from an initial location 212 of the mobile device 202 to the event device 204-1. The path can be an optimal route from the initial location 212 to the event device 204-1. The optimal route can be, for instance, the shortest route and/or fastest route from the initial location 212 to the event device 204-1. The optimal route can be a preconfigured route, and/or can be determined in real time in response to the event occurring.

The initial location can be, for example, a location (e.g., geographic location) of the mobile device 202 (e.g., in the facility) when the event was initiated, a predetermined location (e.g., a control room of the facility, etc.), among other examples. Additionally, in some examples, the mobile device 202 can display a current location 214 of the mobile device 202. For example, the mobile device 202 can display a real-time location as the user is navigating the facility towards the event device 204-1. Such real-time locational navigation can further assist a user of the mobile device 202 in quickly locating the event device 204-1.

As the mobile device 202 gets closer in proximity with the event device 204-1, the mobile device 202 can eventually be within a threshold proximity of the event device 204-1; the mobile device 202 can receive a device identifier associated with the event device 204-1 in response to the mobile device 202 being within the threshold proximity. The device identifier can be a distinctive number or other value uniquely associated with a particular device. For example, the event device 204-1 can broadcast a device identifier associated with the event device 204-1, and when the mobile device 202 is within a threshold proximity of the event device 204-1, the mobile device 202 can receive the device identifier. The device identifier can be, for example, a serial number, a device identity number, unique device ID, device identifier numbers associated with a boot sequence, a media access control (MAC) address, among other examples. The event device 204-1 can broadcast its device identifier wirelessly (e.g., via a Bluetooth, NFC, LTE, WLAN, or any other wireless network relationship as previously described in connection with FIG. 1).

While the event device 204-1 is described above as broadcasting a device identifier associated with the event device 204-1, embodiments of the present disclosure are not so limited. For example, event device 204-2 can also be broadcasting a device identifier uniquely associated with the event device 204-2, and event device 204-N can also be broadcasting a device identifier uniquely associated with the event device 204-N. The mobile device 202 may also receive such device identifiers if the mobile device 202 is within a threshold proximity of event devices 204-2 and/or 204-N. In other words, the mobile device 202 may receive multiple device identifiers from multiple event devices 204 if the mobile device is within a threshold proximity with the multiple event devices simultaneously.

In some examples, the mobile device 202 can cause the event device 204-1 to emit an indicator signal in response to the mobile device 202 being within the threshold proximity of the event device 204-1. For example, when the mobile device 202 receives the device identifier of event device 204-1, the mobile device 202 can transmit instructions to the event device 204-1 to cause the event device 204-1 to emit an indicator signal. The indicator signal can be, for instance, a visual indicator (e.g., an LED that is activated) that can be visible to a user of the mobile device 202, an audible indicator (e.g., a speaker that is activated) that can be audible to the user of the mobile device 202, etc. Such an indicator signal can give a visual and/or audible cue to the user of the mobile device 202 of which event device 204-1 they are proximate to.

The mobile device 202 can determine the signal strengths of the event devices 204-1, 204-2, 204-N. For example, as the user navigates towards the event device 204-1, the mobile device 202 may become proximately located with the event devices 204-1, 204-2, 204-N such that the mobile device 202 can wirelessly communicate with the event devices 204-1, 204-2, 204-N (e.g., as previously described above). Accordingly, the mobile device 202 can determine a signal strength with the event device 204-1 (e.g., SS-1, as illustrated in FIG. 2), determine a signal strength with the event device 204-2 (e.g., SS-2, as illustrated in FIG. 2), and determine a signal strength with the event device 204-N (e.g., SS-N, as illustrated in FIG. 2). The mobile device 202 can utilize the signal strengths and the device identifier to connect with a particular event device 204-1, 204-2, 204-N, as is further described herein.

The mobile device 202 can rank the relative strengths of the determined signal strengths from highest to lowest. For example, the mobile device 202 can determine that SS-1 is the highest signal strength (e.g., the signal strength with the event device 204-1), SS-2 is the middle signal strength (e.g., the signal strength with the event device 204-2), and SS-N is the lowest signal strength (e.g., the signal strength with the event device 204-N). A user of the mobile device 202 can determine that they are likely the closest to event device 204-1 if the signal strength with the event device 204-1 is the highest signal strength.

Additionally, the mobile device 202 can compare the received device identifier to a predetermined device identifier. For example, when the event was initiated, the mobile device 202 can receive a predetermined device identifier (e.g., from a remote computing device, from a control panel, and/or from any other device). The predetermined device identifier can be associated with the event device 204 that is associated with the event. As described above, the event device 204-1 is associated with the event. Accordingly, the mobile device 202 can compare the device identifier received from the event device 204-1 (e.g., received in response to the mobile device 202 being within a threshold proximity of the event device 204-1) with the predetermined device identifier. In response to the device identifier received from the event device 204-1 matching the predetermined device identifier, and in response to the signal strength of the event device 204-1 being the highest signal strength of the determined signal strength of the event devices 204-1, 204-2, 204-N, the mobile device 202 can connect to the event device 204-1.

Utilizing the predetermined device identifier as well as the highest signal strength can prevent the mobile device 202 from connecting with the wrong event device 204. In an emergency situation, this approach can ensure that a user locates the correct event device in the facility, and does not cause the mobile device 202 to indicate that the event is a non-emergency event (e.g., a false alarm) when the event is a real emergency event.

As previously mentioned in FIG. 1, the mobile device 202 can determine an amount of time taken between when the event was initiated and when the mobile device 202 connected to the event device 204-1. In order to determine the amount of time, the mobile device 202 can initiate a timer in response to the event occurring, and cease the timer in response to the mobile device 202 connecting to the event device 204-1. For example, if event device 204-1 is initiated by a control panel for training purposes, the mobile device 202 can initiate a timer in response to the event being initiated, and cease the timer in response to the mobile device 202 connecting to the event device 204-1. The timer may indicate, for example, that a user of the mobile device 202 took eight minutes from when the event was initiated to locate the event device 204-1 such that the mobile device 202 was able to connect to the event device 204-1.

The mobile device 202 can transmit the user profile associated with the mobile device 202 and the amount of time to a remote computing device. The remote computing device can determine whether the amount of time is less than a threshold amount of time and can generate a report based on the received user profile and the amount of time, as is further described in connection with FIG. 3.

Figure 3:
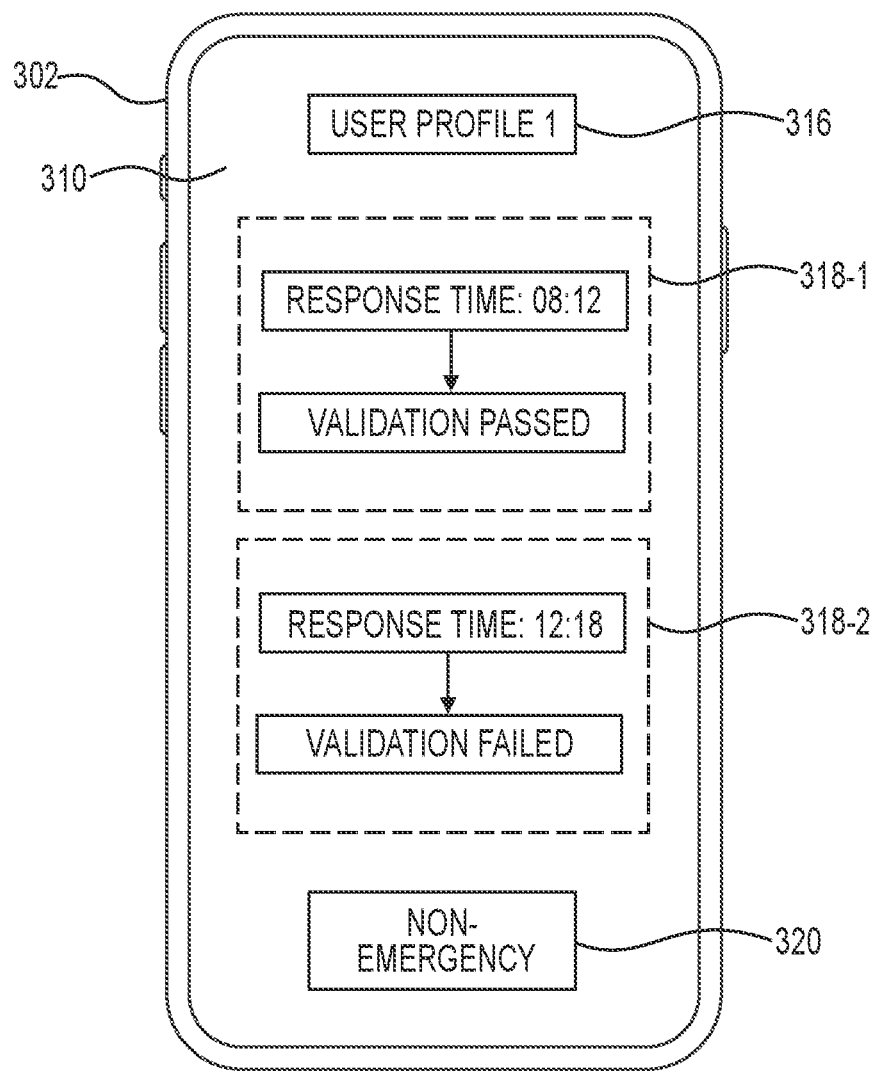
FIG. 3 is an example of a display of a mobile device displaying a report for validating an event response in an event system, in accordance with one or more embodiments of the present disclosure.

FIG. 3 is an example of a display 310 of a mobile device 302 displaying a report 318 for validating an event response in an event system, in accordance with one or more embodiments of the present disclosure. The display 310 can further display the user profile 316 and a button 320.

In some examples, the event device may detect an event and the user of the mobile device 302 can respond to locate the event. The user may verify that the detected event is a non-emergency event (e.g., is a false alarm). When the mobile device connects to the event device, the user may provide an input to the display 310 of the mobile device 302 via the button 320 to indicate the event is a non-emergency event, and a control panel can silence the event.

As previously described in connection with FIGS. 1 and 2, a remote computing device can generate a report 318 for a user profile based on the amount of time between when an event was initiated and when the mobile device 302 connected to the corresponding event device. For example, the remote computing device can generate a report indicating the user profile 316 (e.g., User Profile 1) passed validation of the event in response to the amount of time (e.g., 8 Minutes, 12 Seconds) taken between initiation of the event and the mobile device 302 connecting to the corresponding event device being less than the threshold amount of time (e.g., 10 Minutes). Such a report 318-1 can be displayed on the display 310 of the mobile device 302. This report 318-1 can help indicate that the user associated with the user profile 316 may be fully trained and able to effectively respond to an emergency event in the facility.

As another example, the remote computing device can generate a report indicating the user profile 316 (e.g., User Profile 1) did not pass validation of the event in response to the amount of time (e.g., 12 Minutes, 18 Seconds) taken between initiation of the event and the mobile device 302 connecting to the corresponding event device being greater than the threshold amount of time (e.g., 10 Minutes). Such a report 318-2 can be displayed on the display 310 of the mobile device 302. This report 318-2 can help indicate that the user associated with the user profile 316 may need additional training to be able to effectively respond to an emergency event in the facility. Accordingly, the user may be assigned additional remedial training.

The reports 318-1 and/or 318-2 can be generated and stored at the remote computing device and accessible for display by the mobile device. However, embodiments of the present disclosure are not so limited. In some examples, the reports 318-1 and/or 318-2 can be generated by the remote computing device and stored by the mobile device for display by the mobile device.

Accordingly, validating an event response in an event system can allow for a mobile device to assist a user to easily and quickly locate an event device having an event in a facility. The mobile device can allow the user to accurately locate the correct event device when multiple event devices may exist during a training event and/or during an actual emergency event. Such an approach can provide training opportunities for users of a mobile device so that the users can easily and efficiently locate event devices in the facility in the event of an emergency. Additionally, reports can be generated based on actions taken by the users during a training event and/or during an emergency event, which can be used for remedial training purposes and/or for emergency response review purposes, respectively. Such an approach can allow for more efficient and less costly training, management, and guidance of support staff in managing an event system in a facility, as compared with previous approaches.

Figure 4:
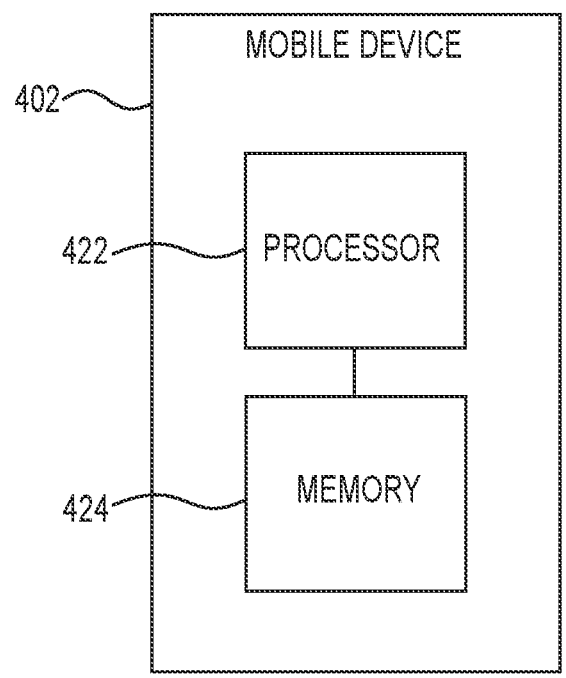
FIG. 4 is an example of a mobile device for validating an event response in an event system, in accordance with one or more embodiments of the present disclosure.

FIG. 4 is an example of a mobile device 402 for validating an event response in an event system, in accordance with one or more embodiments of the present disclosure. As illustrated in FIG. 4, the mobile device 402 can include a memory 424 and a processor 422 for validating an event response in an event system, in accordance with the present disclosure.

The memory 424 can be any type of storage medium that can be accessed by the processor 422 to perform various examples of the present disclosure. For example, the memory 424 can be a non-transitory computer readable medium having computer readable instructions (e.g., executable instructions/computer program instructions) stored thereon that are executable by the processor 422 for validating an event response in an event system in accordance with the present disclosure.

The memory 424 can be volatile or nonvolatile memory. The memory 424 can also be removable (e.g., portable) memory, or non-removable (e.g., internal) memory. For example, the memory 424 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 424 is illustrated as being located within mobile device 402, embodiments of the present disclosure are not so limited. For example, memory 424 can also be located internal to another computing resource (e.g., enabling computer readable instructions to be downloaded over the Internet or another wired or wireless connection).

The processor 422 may be a central processing unit (CPU), a semiconductor-based microprocessor, and/or other hardware devices suitable for retrieval and execution of machine-readable instructions stored in the memory 424.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A mobile device for validating an event response in an event system, comprising:
    a memory; and
    a processor configured to execute executable instructions stored in the memory to:
        determine signal strengths of a plurality of event devices;
        connect to an event device of the plurality of event devices in response to an event occurring associated with the event device;
        determine an amount of time taken between when the event was initiated and when the mobile device connected to the event device;
        receive an input indicating the event is a non-emergency event; and
        transmit, to a remote computing device, a user profile associated with the mobile device, the amount of time, and the input to cause a control panel to silence an alarm associated with the event in response to the event being the non-emergency event.

2. The mobile device of claim 1, wherein the processor is configured to connect to the event device in response to a signal strength of the event device being the highest signal strength of the determined signal strengths of each of the plurality of event devices.

3. The mobile device of claim 1, wherein the processor is configured to execute the instructions to receive a device identifier associated with the event device in response to the mobile device being within a threshold proximity of the event device.

4. The mobile device of claim 3, wherein the mobile device is configured to connect to the event device in response to:
the device identifier matching a predetermined device identifier; and
a signal strength of the event device being the highest signal strength of the determined signal strengths of each of the plurality of event devices.

5. The mobile device of claim 1, wherein the processor is configured to execute the instructions to cause the event device to emit an indicator signal in response to the mobile device being within a threshold proximity of the event device.

6. The mobile device of claim 1, wherein the mobile device is configured to determine the amount of time by:
initiating a timer in response to the event occurring; and
ceasing the timer in response to the mobile device connecting to the event device.

7. The mobile device of claim 1, wherein the event is a training event.

8. A system for validating an event response in an event system, comprising:
a mobile device configured to:
determine signal strengths of a plurality of event devices
connect to an event device of the plurality of event devices in response to an event occurring associated with the event device;
determine an amount of time taken between when the event was initiated and when the mobile device connected to the event device;
receive an input indicating the event is a non-emergency event; and
transmit, to a remote computing device, a user profile associated with the mobile device, the amount of time, and the input;
the remote computing device configured to generate a report based on the received user profile and the amount of time; and
a control panel configured to silence an alarm associated with the event based on the input in response to the event being the non-emergency event.

9. The system of claim 8, wherein the control panel is configured to initiate the event.

10. The system of claim 8, wherein the event device is configured to initiate the event in response to detecting the event.

11. The system of claim 10, wherein the control panel is further configured to silence the event in response to the mobile device connecting to the event device.

12. The system of claim 8, wherein the remote computing device is configured to determine whether the amount of time is less than a threshold amount of time.

13. The system of claim 12, wherein the remote computing device is configured to:
generate the report indicating the user profile passed validation of the event in response to the amount of time being less than the threshold amount of time; and
generate the report indicating the user profile failed validation of the event in response to the amount of time being greater than the threshold amount of time.

14. The system of claim 8, wherein the mobile device is configured to display directions to the event device from an initial location of the mobile device via a display of the mobile device.

15. A method for validating an event response in an event system, comprising:
initiating an event associated with an event device of a plurality of event devices included in the event system;
determining, by a mobile device, signal strengths of each of the plurality of event devices;
connecting, by the mobile device, to an event device of the plurality of event devices included in the event system in response to:
a signal strength of the event device being the highest signal strength of the determined signal strengths of each of the plurality of event devices; and
a device identifier associated with the event device matching a predetermined device identifier on the mobile device;
determining, by the mobile device, an amount of time taken between when the event was initiated and when the mobile device connected to the event device;
receiving, by the mobile device, an input indicating the event is a non-emergency event;
transmitting, by the mobile device to a remote computing device, a user profile associated with the mobile device, the amount of time, and the input;
determining, by the remote computing device, whether the amount of time is less than a threshold amount of time;
silencing, by a control panel, an alarm associated with the event in response to the event being the non-emergency event; and
generating, by the remote computing device, a report for validating the event response for the user profile associated with the mobile device based on whether the amount of time is less than the threshold amount of time.

16. The method of claim 15, wherein the method includes initiating the event by the control panel, wherein the event is a training event.

17. The method of claim 15, wherein the method includes broadcasting, by the event device, the device identifier.

* * * * *